United States Patent [19]

Beeson, III

[11] Patent Number: 4,821,557

[45] Date of Patent: Apr. 18, 1989

[54] METHOD AND APPARATUS FOR DETERMINING THE ACCURACY OF A GAS FLOW METER

[75] Inventor: James S. Beeson, III, Shreveport, La.

[73] Assignee: Arkla, Inc., Shreveport, La.

[21] Appl. No.: 165,469

[22] Filed: Mar. 8, 1988

[51] Int. Cl.[4] .............................................. G01F 25/00
[52] U.S. Cl. ....................................................... 73/3
[58] Field of Search ............................................. 73/3

[56] References Cited

U.S. PATENT DOCUMENTS

| Re. 29,383 | 9/1977 | Gallatin et al. | 137/14 |
|---|---|---|---|
| 3,446,055 | 5/1969 | Tuck et al. | 73/3 |
| 3,726,296 | 4/1973 | Friedland et al. | 137/1 |
| 3,746,041 | 7/1973 | Friedland | 137/599 |
| 3,750,472 | 8/1973 | Ducousset | 73/3 X |
| 3,772,877 | 11/1973 | Friedland | 236/99 X |
| 3,785,389 | 1/1974 | Friedland et al. | 137/1 |
| 3,875,955 | 4/1975 | Gallatin et al. | 137/14 |
| 3,875,964 | 4/1975 | Friedland | 137/599 |
| 3,937,248 | 2/1976 | Hutton | 137/599 X |
| 3,942,553 | 3/1976 | Gallatin | 137/599 |
| 4,096,746 | 6/1978 | Wilson et al. | 73/3 X |
| 4,148,340 | 4/1979 | Hutton | 137/599 |
| 4,341,107 | 6/1982 | Blair et al. | 73/3 |
| 4,419,898 | 12/1983 | Zanker et al. | 73/3 X |
| 4,538,446 | 9/1985 | Singh et al. | 73/3 |
| 4,566,307 | 1/1986 | Boykin | 73/3 |
| 4,590,790 | 5/1986 | Hicks et al. | 73/3 |
| 4,753,095 | 6/1988 | Jones, Jr. et al. | 73/3 X |

FOREIGN PATENT DOCUMENTS

| 33628 | 3/1980 | Japan | 73/3 |
| 96423 | 7/1980 | Japan | 73/3 |
| 543285 | 10/1919 | U.S.S.R. | 73/3 |

OTHER PUBLICATIONS

"Danalyzer, The BTU Gas Chromatograph", Daniel Industries, Inc. (1986) pp. 1-10.
"Introducing the Digicon & Digicell Valves, Meters and Provers", The Digitial Valve Company, Longmont, Colorado, 12 pages; published by Nov. 1988.
Britton, Charles L., "Sonic Nozzles", Appalachian Gas Measurement Short Course, West Virginia University, Aug. 12-14, 1975 (20 pages & 11 Drawing Figures & 4 Tables).

Primary Examiner—Tom Noland
Attorney, Agent, or Firm—Nixon & Vanderhye

[57] ABSTRACT

Method and apparatus for determining (i.e., proving) the accuracy of a gas flow meter includes the use of a flow determining valve to derive flow data representative of actual gas flow rate simultaneously with similar flow data obtained from the meter. Real time quantitative analysis of the gas stream constituents is employed during meter proving (as may be accomplished with an automated gas chromatograph) so as to condition the flow data obtained from the flow determining valve and hence provide a more accurate determination of actual gas flow rate. This conditioned flow data is then compared to the flow data obtained from the meter to thereby derive a variance factor for the meter at given sensed flow rates. Therefore, flow rate data obtained from the meter may then be adjusted as a function of the derived variance factor so that a more accurate determination of actual flow rate through the meter is possible.

19 Claims, 2 Drawing Sheets

METHOD AND APPARATUS FOR DETERMINING THE ACCURACY OF A GAS FLOW METER

FIELD OF THE INVENTION

This invention relates to method and apparatus for determining the accuracy of gas flow meters (i.e., sometimes called "proving" a meter in art parlance). In a specific embodiment, the invention is in the form of a mobile meter proving unit which can be dispatched to the site of a meter for field-proving. The invention (whether embodied in mobile or stationary units) is capable of determining the quantity of at least one chemical constituent of the gas flowing through the meter, and then conditioning a proving signal (i.e., which is indicative of the actual gas flow through the meter) on the basis of the detected chemical constituent quantity. This, in turn, provides for a more precise generation of an error factor for the meter at this actual gas flow (i.e., to determine the amount by which the indicated signal generated by the meter deviates from a true signal representative of the actual flow).

BACKGROUND AND SUMMARY OF THE INVENTION

Proving the accuracy of flow meters is very important for suppliers of natural gas and/or any other gas which is purchased by a supplier's customers. That is, since the cost of the supplied gas is computed by the amount of gas flowing through the meter, then any meter deviation from the actual amount of gas which is supplied to the customer will result in an undercharge/overcharge for that particular customer. As may be appreciated, over time, the underchanging/overcharging could result in significant/customer, respectively.

In order to reduce such potential economic losses, it has been the industry practice for some time to periodically check the accuracy of flow meters in the field (i.e., provide stationary on-site proving apparatus at the meter in the gas pipeline). There are, however some disadvantages to these conventional meter proving systems. For example, conventional meter proving systems are usually provided for each meter in the pipeline for which proving is desired. Thus, the conventional proving system is stationary at the meter site thereby requiring a replication of such a system for each meter for which proving is desired. This, of course, results in greater costs to the gas supplier associated with proving of the supplier's meters. Hence, it would especially be desirable if a meter proving system was provided which was mobile --i.e., a system which could be dispatched and transported from one meter to be proved to another.

The present practice of proving gas flow meters is to determine as accurately as possible the actual flow rate of the gas flowing through the meter. This is usually accomplished with a high precision sonic valve array downstream of the meter. The sonic valve array will output a signal indicative of the volumetric flow rate of gas and this flow rate is then converted to a mass flow rate using well known algorithms. However, some of the variables used in these known algorithms depend upon the mass quantities of the various gas constituents flowing through the pipeline (e.g., for natural gas these constituents may be $CO_2$, methane, ethane, propane, and others). The present practice is to predetermine the quantities of the various gas constituents in advance of meter proving, (as by submitting a sample of the gas to a laboratory for quantitative analysis) and then inputting the results of this quantitative predetermination into the proving system in the form of "constants". Obviously, the quantitative gas constituency may change between the time that the analysis is completed and the time that the meter is actually proved thereby possibly contributing to a less than accurate error factor for the meter.

It would therefore particularly be desirable in terms of accuracy if a meter proving system was provided which measures quantitatively the various gas constituents in real time (i.e., concurrently with the meter proving). Thus, if a real time quantitative gas constituent measurement was possible, then the resulting signal representative of the actual mass flow of the gas could be conditioned on the basis of the real time measured quantities thereby providing for more accurate determination of the actual gas flow rate.

According to the present invention, method and apparatus are provided which not only permit gas flow meters to be proved on-site via a mobile gas proving unit, but which also use real time quantitative measurements of the gas constituents flowing through the meter so that more accurate meter proving results.

The invention achieves these objectives by providing a self-contained meter proving system in association with a suitable vehicle. Thus, all that is needed to prove a meter in the field is to dispatch the mobile proving unit and to obtain the error factors for particular meters. These error factors can then be downloaded into the supplier's main data file, for example, so that subsequent charges for gas supplied to a customer (based on the meter's output) can be adjusted by the error factor.

A more accurate determination of the meter's error factor is achieved by providing a device which is capable of quantitatively deriving the presence of any preselected number of gas constituents. Preferably, the device employed with the present invention to accomplish this function is a gas chromatagraph which outputs a signal representative of the quantitative presence of each of a predetermined number of gas constituents in the gas flow. This outputted signal is then supplied as an input for determining mass flow data for the gas stream using well known algorithms. In such a manner, real time quantitative analysis of the gas stream flowing through the meter is obtained thereby providing a more accurate determination of the meter's error factor.

These and other advantages of the invention will become more clear to the reader after consideration is given to the following detailed description of the preferred exemplary embodiment.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENT

Figure 1:
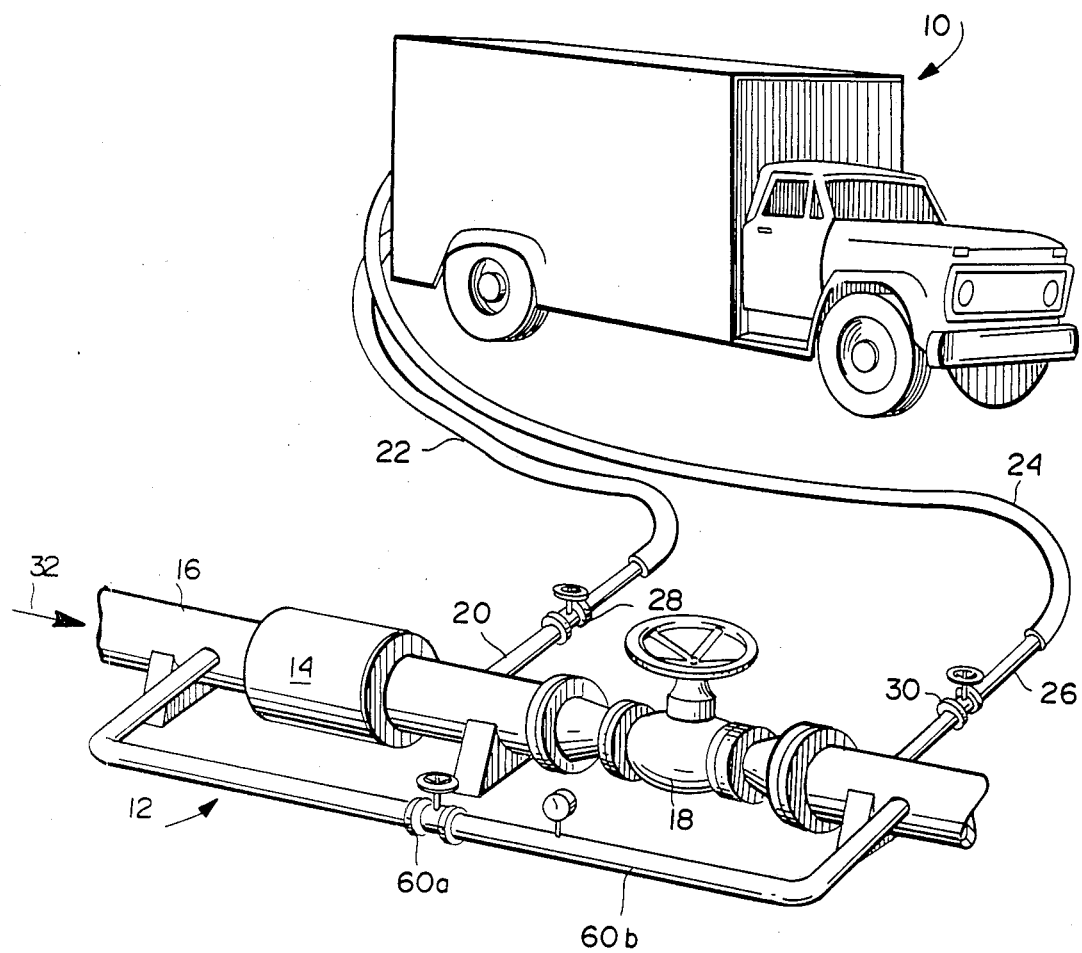
FIG. 1 is a schematic view of a mobile meter proving unit of this invention at the field site of a meter to be proved.

A schematic representation of a mobile meter proving unit 10 which had been dispatched to a field site 12 of a glass flow meter 14 installed in a gas pipe line 16 is shown in accompanying FIG. 1. The pipe line 16 includes, downstream of the flow meter 14, a full port block valve 18 which is closed during meter proving so as to direct gas flow through bypass outlet 20 and into the mobile meter proving unit 10 via flexible conduit 22. The gas then returns to pipe line 16 via flexible conduit 24 and bypass pipe 26. Of course, when meter proving is finished, the flexible conduits 22 and 24 are housed within the mobile unit 10 after first opening block valve 18 and closing the valves 28 and 30 so that gas again flows directly through the line 16 in the direction of arrow 32. It should be noted that customer "starvation" does not occur during meter proving using the mobile unit 10 of this invention since a constant flow of gas is provided downstream of block valve 18 due to the bypassing of a portion of the gas stream through valve 60a in bypass line 60b. That is, bypass line 60b is provided so that at least some gas flow is diverted around meter 14 and the block valve 18 (and thus also around the proving valve 46 - see FIG. 2).

The mobile proving unit 10 thus permits field-proving of gas flow meters since the flexible conduits 22, 24 may be carried by the unit 10 and connected quickly to the bypass conduits 20 and 26, respectively. In this regard, any conventional "quick-disconnect" coupling system may be employed to join conduits 22 and 24 to conduits 20 and 26.

Figure 2:
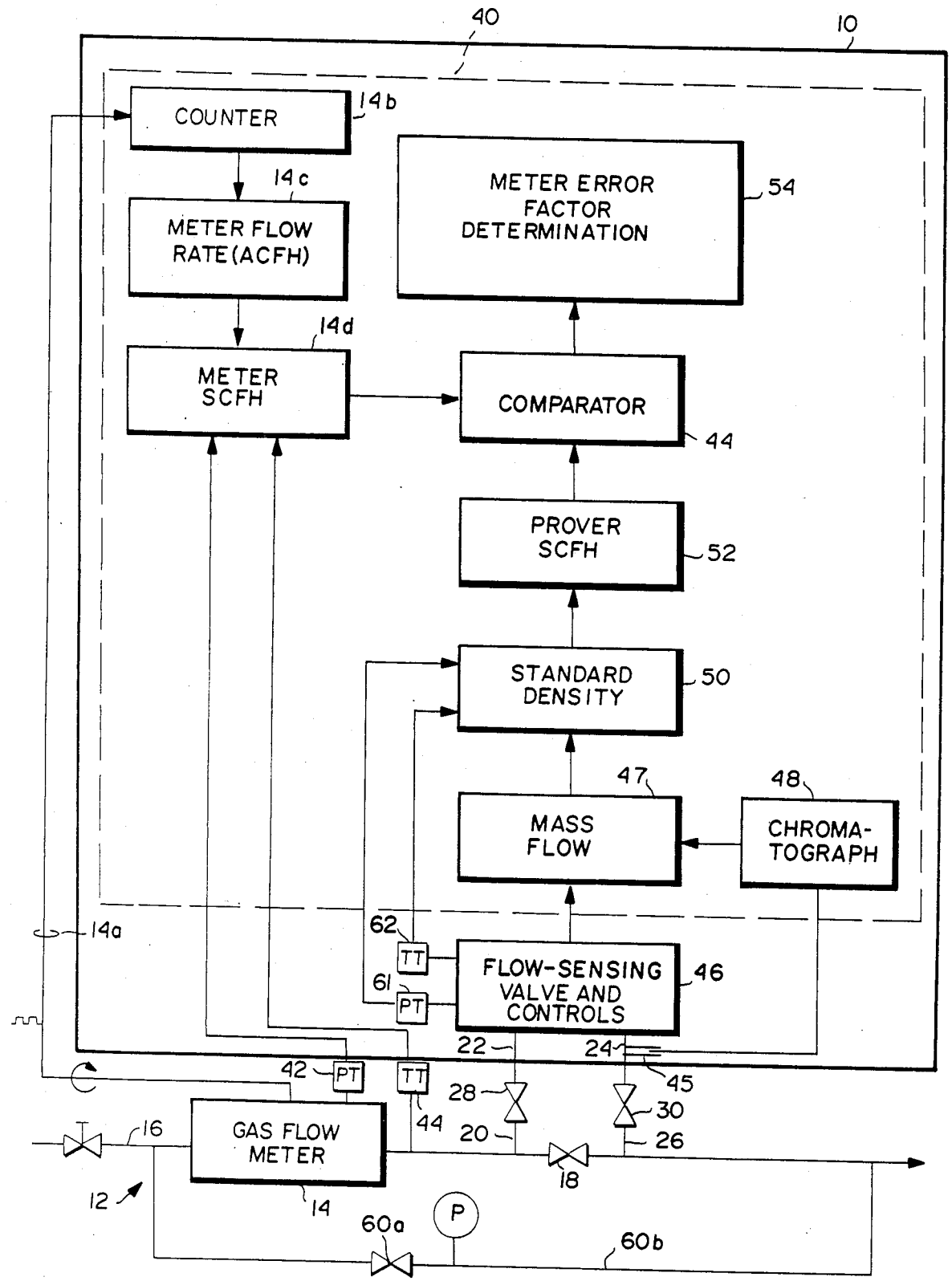
FIG. 2 is a schematic block diagram of a preferred system employed by the present invention to prove a gas flow meter.

The physical contents of mobile proving unit 10 and their relationship to the on-site meter location 12 during a meter proving operation is shown schematically in block-diagram fashion in accompanying FIG. 2.

The meter 14 shown schematically in FIG. 2 is of a conventional turbine variety which generates a pulsed output 14a. The pulsed output 14a is supplied to a pulse counter 14b which counts the number of pulses of the gas flow meter 14 and supplies this count to a flow rate calculator 14c which is part of a microprocessor-based computer 40 contained within the mobile proving unit 10. The output of meter flow rate calculator 14c is the actual cubic feet per hour (ACFH) which is measured by the gas flow meter 14. This signal is converted in block 14d to standard cubic feet per hour (SCFH) by inputting pressure and temperature signals from pressure and temperature transmitters 42, 44, respectively, connected operatively to the gas flow meter 14 and gas pipe line 16 during meter proving.

During a meter proving operation, the output from block 14d is compared at comparator 44 to a signal indicative of the standard cubic feet per hour which is measured via a flow sensing valve 46 housing within the mobile unit 10. The flow sensing valve 46 can be of any conventional, high accuracy type (e.g., sonic nozzle) gas flow sensing valve. Preferably, it is a valve having a series of individually actuable, value weighted, digital bistable valve elements as is described more fully in U.S. Pat. Nos. Re. 29,383 issued Sept. 6, 1977 (re-issue of U.S. Pat. Nos. 3,875,955 issued Apr. 8, 1975); 3,785,389 issued Jan. 15, 1974; 3,746,041 issued July 17, 1973; and 3,942,553 issued Mar. 9, 1976, the entire contents of each of these prior-issued U.S. Patents being expressly incorporated hereinto by reference. The preferred valve is a Digital ® valve which may be commerically obtained from the Digital Valve Company, Longmont, Colorado.

The output from the flow sensing valve 46 is applied as an input to a mass flow calculator 47 which calculates mass flow according to the following equation:

$$M = \frac{PAC^*Cd}{\sqrt{RT}}$$

where M is the actual mass flow rate in pounds, P is the gas pressure in absolute pounds per square inch (psia), A is the area constant for the nozzle throat of valve 46 in square inches, $C^*$ is a critical flow factor, Cd is the discharge coefficient or actual mass flow rate divided by theoretical mass flow rate, R is the gas constant which is equal to 48.03 divided by the molecular weight of the gas stream, and T is the gas temperature in degrees Rankine.

Important to the present invention, a sample sidestream of gas is withdrawn from the outlet 24 at sample port 45 (downstream of flow-sensing valve 46) and is directed to a chromatagraph 48 which analyzes the gas stream so as to determine the molecular weight of the gas stream in addition to the quantitative presence of the gas stream constituents (e.g., $CO_2$, methane, ethane, propane, and the like). Each of these constituents is then represented by an output signal (which may be indicative of the mole percentage of each individual constituent) which in turn, is supplied as an input to the mass flow calculator 47.

Any suitable automated gas constituent analyzer may be employed in the successful practice of this invention. One particularly preferred analyzer is the Danalyzer ™ chromatagraph commercially available from the Electronic Division of Daniel Industries, Inc. of Houston, Tex.

Mass flow calculator 47 uses known algorithms to generate the value for $C^*$ and the gas constant R based on real time quantitative measurement of the gas stream constituents. (For a more complete understanding of the gas flow algorithms employed in mass flow calculator 47 and elsewhere, the reader's attention is directed to Britton, "Sonic Nozzles", Appalachian Gas Measurement Short Course, West Virginia University, Aug. 12–14, 1975, the entire content of which is expressly incorporated hereinto by reference.)

The standard density is then calculated in block 50 as a function of the pressure and temperature signals from pressure and temperature transmitters 61, 62, respectively, operatively associated with the proving valve 46. The standard cubic feet per hour (SCFH) of the proving valve 46 is then calculated in block 52 by dividing the mass flow rate derived in block 47 (and conditioned by the input from chromatagraph 48) by the standard density derived in block 50. The prover SCFH and the meter SCFH are then compared in comparator 44 and this comparison is used in block 54 so as to obtain a meter error factor at a corresponding flow rate which is sensed by the meter is ultimately obtained. These error factors may then be "downloaded" into the gas supplier's main data file in the form of an electronic "look-up" table, for example, so that subsequent charges to a customer at any given flow rate may be determined more accurately.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for determining the accuracy of a gas flow meter comprising the steps of:
   allowing gas to flow simultaneously through the meter and a flow determining valve;
   deriving flow data from the meter and said flow determining valve;
   comparing said derived data to obtain a variance factor for said meter, and
   determining the relative quantities of gas constituents in said gas flow simultaneously with said step of deriving flow data from the meter and the flow determining valve, and then conditioning said derived flow data based upon said determined gas constituent quantities.

2. A method for determining the accuracy of gas flow measurements of a meter installed in a gas flow line comprising the steps of:
   obtaining a first signal from said meter which is expected to be indicative of gas flow measurement by said meter corresponding to an actual gas flow rate through said line;
   obtaining a second signal from a gas flow calibration valve which is also expected to be indicative of said actual gas flow rate;
   determining the quantity of at least one constituent of the gas flowing through the line in real time with said step of obtaining the first signal from the meter, and then conditioning in real time said second signal on the basis of said determined quantity of said at least one gas constituent so as to obtain a conditioned gas flow signal; and
   deriving an error factor for said meter at said expected actual gas flow rate by comparing said first signal and said conditioned second signal.

3. A method as in claim 2 wherein said step of determining the quantitative presence of said at least one gas constituent includes continually withdrawing a sample of said gas flowing through the gas flow line, and passing the withdrawn sample to a gas chromatograph means which determines said quantitative presence.

4. A method as in claim 2 wherein the gas flowing through the gas flow line is natural gas.

5. A method for determining the accuracy of gas flow measurements of a meter comprising the steps of:
   obtaining a first signal indicative of meter flow measurement at an actual gas flow rate;
   obtaining a second signal indicative of said actual gas flow rate; and
   comparing said first and second signals so as to derive a correction factor for said meter flow measurement, wherein
   said step of obtaining said second signal includes determining a quantitative presence of at least one constituent of the gas at said actual flow rate in real time with said step of obtaining the first signal, and then conditioning, in real time, said second signal prior to said signal comparing step, whereby said correction factor is adjusted on the basis of said determined quantitative presence.

6. A method for determining the accuracy of a gas flow meter installed in a gas line through which a gas mixture flows, said method comprising the steps of:
   generating a flow measurement signal from said meter at a predetermined actual flow rate;
   passing said gas through a sonic nozzle valve and generating a flow determining signal in response thereto;
   determining the quantitative presence of at least one gas constituent of said gas mixture substantially simultaneously with said step of generating a flow measurement signal from the meter, and deriving a gas constant based upon said substantially simultaneously determined quantitative presence;
   adjusting said flow determinating signal on the basis of said derived gas constant; and
   comparing said flow measurement signal and said flow determinating signal to obtain a flow correction factor for said meter at said predetermined actual flow rate.

7. A method as in claim 6 wherein said step of determining the quantitative presence of said at least one gas constituent includes continually withdrawing a sample of said gas flowing through the gas flow line downstream of said sonic nozzle, and passing the withdrawn sample to a gas chromatograph which determines said quantitative presence.

8. A method as in claim 6 wherein the gas flowing through the gas flow line is natural gas.

9. Apparatus for determining the accuracy of gas flow measurements of a meter which outputs a measurement signal indicative of meter flow measurement at an actual gas flow rate therethrough, said apparatus comprising:
   valve means for obtaining a calibration signal indicative of said actual gas flow rate; and
   means for comparing said measurement and calibration signals so as to derive a correction factor for said meter flow measurement at said actual gas flow rate, wherein
   said means for obtaining said calibration signal includes;
   (i) gas constituent determining means for determining a quantitative presence of at least one constituent of the gas at said actual flow rate in real time with the measurement signal; and
   (ii) means for conditioning said calibration signal on the basis of said determined quantitative presence so that said comparing means compares said measurement signal and said conditioned calibration signal, whereby said correction factor is adjusted on the basis of said determined quantitative presence.

10. Apparatus as in claim 9, wherein said gas constituent determining means includes a gas chromatograph.

11. Apparatus as in claim 10, wherein said gas constituent determining means includes a sample port for withdrawing continually a sample of said gas downstream of said flow determining valve and for passing said withdrawn sample to said gas chromatograph.

12. Apparatus as in claim 9, also comprising connection means adapted to being connected operatively with a gas flow line, said connection means including flexible conduits adapted to being removably connected to stationary supply and discharge nipples associated with the gas flow line.

13. Apparatus for determining the accuracy of a gas flow meter comprising:
   a flow determining valve;
   means which allow gas to flow simultaneously through the meter and said flow determining valve;

means for deriving real time flow data from said meter and said flow determining valve; and means for comparing said derived data to obtain a variance factor for said gas flow meter, wherein said means for deriving flow data from said determining valve includes means for determining in real time the relative quantitative of gas constituents in said gas flow and then deriving said real time flow data based upon said real time determined gas constituent quantities.

14. A mobile gas meter proving system comprising:
a vehicle; and
means housed within said vehicle for proving accuracy of a gas meter, said means for proving accuracy including,
 (i) a flow determining valve;
 (ii) means adapted to being connected operatively with a gas flow line in which the gas flow meter is located so as to allow the gas to flow simultaneously through the meter and said flow determining valve;
 (iii) means for deriving flow data from said meter and said flow determining valve; and
 (iv) means for comparing said derived data to obtain a variance factor for said gas flow meter, wherein
 (v) said means for deriving flow data from said determining valve includes means for determining the relative quantities of gas constituents in said gas flow and then deriving said flow data based upon said gas constituents quantities.

15. A mobile gas meter proving system as in claim 14, wherein said gas constituent determining means includes a gas chromatograph.

16. A mobile gas meter proving system as in claim 14, wherein said gas constituent determining means includes a sample port for withdrawing continually a sample of said gas downstream of said flow determining valve and for passing said withdrawn sample to said gas chromatograph.

17. A mobile gas meter proving system comprising:
a vehicle; and
means housed within said vehicle for proving accuracy of a gas flow meter, said means for proving accuracy including,
 (i) a flow determining valve;
 (ii) means adapted to being connected operatively with a gas flow line in which the gas meter is located so as to allow the gas to flow simultaneously through the gas flow meter and said flow determining valve;
 (iii) means for deriving flow data from the gas flow meter and said flow determining valve;
 (iv) means for comparing said derived data to obtain a variance factor for the gas flow meter, and
 (v) means for quantitatively determining at least one constituent of the gas and for conditioning said derived flow data based upon said determined quantity of said at least one gas constituent.

18. A mobile gas meter proving system as in claim 16 or 17, wherein said gas line includes inlet and outlet conduits and valve means associated with said inlet and outlet conduits, and wherein said system further includes flexible conduit means adapted to being interconnected to said inlet and outlet conduits so as to continuously supply gas from the gas line to said flow determining valve from the gas line, and return gas to the gas line from the flow determining valve.

19. A mobile gas meter proving system as in claim 17, wherein said flow determining valve is a sonic nozzle valve.

* * * * *